United States Patent
Shao et al.

(10) Patent No.: US 11,803,494 B2
(45) Date of Patent: Oct. 31, 2023

(54) DATA COMMUNICATION METHOD, MASTER DEVICE AND SYSTEM

(71) Applicant: FRSKY ELECTRONIC CO., LTD., Jiangsu (CN)

(72) Inventors: Bo Shao, Jiangsu (CN); Huijie Zhang, Jiangsu (CN); Zhongmin Shang, Jiangsu (CN); Nan Li, Jiangsu (CN)

(73) Assignee: FRSKY ELECTRONIC CO., LTD., Jiangsu (CN)

( * ) Notice: Subject to any disclaimer, the term of this patent is extended or adjusted under 35 U.S.C. 154(b) by 28 days.

(21) Appl. No.: 17/638,194

(22) PCT Filed: Aug. 21, 2020

(86) PCT No.: PCT/CN2020/110359
§ 371 (c)(1),
(2) Date: Feb. 25, 2022

(87) PCT Pub. No.: WO2021/036911
PCT Pub. Date: Mar. 4, 2021

(65) Prior Publication Data
US 2022/0358065 A1    Nov. 10, 2022

(30) Foreign Application Priority Data

Aug. 28, 2019  (CN) .......................... 201910799375.1

(51) Int. Cl.
*G06F 13/362* (2006.01)
*G06F 13/40* (2006.01)

(52) U.S. Cl.
CPC ........ *G06F 13/362* (2013.01); *G06F 13/4063* (2013.01)

(58) Field of Classification Search
CPC . G06F 13/362; G06F 13/4063; B64C 39/024; B08G 5/0069

(Continued)

(56) References Cited

U.S. PATENT DOCUMENTS

| 4,683,531 A | 7/1987 | Kelch et al. |
| 9,043,047 B2 * | 5/2015 | Feldkamp ............. B60R 25/102 701/2 |

(Continued)

FOREIGN PATENT DOCUMENTS

| CN | 1784919 | 6/2006 |
| CN | 103929826 | 7/2014 |
| CN | 110620609 | 12/2019 |

OTHER PUBLICATIONS

"International Search Report (Form PCT/ISA/210)" of PCT/CN2020/110359, dated Nov. 11, 2020, pp. 1-4.

(Continued)

*Primary Examiner* — Brian T Misiura
(74) *Attorney, Agent, or Firm* — JCIPRNET

(57) ABSTRACT

Disclosed by the present application are a method, master device and system for data communication. The method comprises: initiating a communication signal to an interface in an interface module; when response information from a slave device connected in the interface is received, adding physical ID information of the interface into an online queue, wherein the probability that interfaces in the online queue is subsequently initiated by the communication signal is higher than that of interfaces in an idle queue; and receiving data information transmitted by the slave device in the interface. The data communication master device of the present application comprises a communication signal initiation unit, an online interface identification unit and a data information receiving unit corresponding to the implementation of steps of the described method. Therefore, the communication network for multiple slave devices and a master device has high communication efficiency.

25 Claims, 5 Drawing Sheets

(58) Field of Classification Search
USPC .......................................................... 710/107
See application file for complete search history.

(56) References Cited

U.S. PATENT DOCUMENTS

| | | | |
|---|---|---|---|
| 11,112,798 B2* | 9/2021 | Egner | ........................ G06T 7/70 |
| 11,210,137 B2* | 12/2021 | Suvitie | .................. G06F 9/3887 |
| 2003/0023409 A1 | 1/2003 | Simbirski et al. | |
| 2004/0034871 A1* | 2/2004 | Lu | ........................... H04L 47/20 |
| | | | 725/111 |
| 2013/0322504 A1* | 12/2013 | Asati | ....................... H04L 41/12 |
| | | | 375/224 |
| 2022/0050133 A1* | 2/2022 | Newman | ............ G01R 29/0892 |
| 2022/0374027 A1* | 11/2022 | Watts | ..................... G05D 1/101 |

OTHER PUBLICATIONS

"Written Opinion of the International Searching Authority (Form PCT/ISA/237)" of PCT/CN2020/110359, dated Nov. 11, 2020, pp. 1-6.

* cited by examiner

DATA COMMUNICATION METHOD, MASTER DEVICE AND SYSTEM

CROSS-REFERENCE TO RELATED APPLICATION

This application is a 371 of international application of PCT application serial no. PCT/CN2020/110359, filed on Aug. 21, 2020, which claims the priority benefit of China application no. 201910799375.1, filed on Aug. 28, 2019. The entirety of each of the above mentioned patent applications is hereby incorporated by reference herein and made a part of this specification.

TECHNICAL FIELD

The present invention relates to the field of communications technologies, and in particular to a data communication method, device, and system.

DESCRIPTION OF RELATED ART

Along with the development of the technology, especially the application and popularization of the telemetry in the field of unmanned aerial vehicles, more and more sensors with different functions and types have been applied to unmanned aerial vehicles. Therefore, the communication problem between various types of sensors and receivers becomes increasingly complex. However, the information such as field parameters of unmanned aerial vehicles collected by the sensors is very important for the control of the unmanned aerial vehicles, so that the data transmission between the sensors and the receivers is very important.

At present, the data transmission mainly adopts a conventional wireless communication mode which remains the problems of weak reliability, complex interfaces, no support of hot plug and the like.

In view of the above problems, no effective solution has been proposed yet.

SUMMARY

In one aspect of the present invention, provided is a data communication method, comprising:

initiating a communication signal to an interface in an interface module, wherein the communication signal comprises physical ID information of the interface;

identifying whether the interface is online, adding the physical ID information of the interface into an online queue under the condition of receiving response information of a slave device connected to the interface, wherein a probability that one interface in the online queue is initiated with a subsequent communication signal is higher than that of one interface in an idle queue; and receiving data information transmitted by the slave device in the interface.

In another aspect of the present invention, provided is a data communication device, comprising:

a communication signal initiation unit, used for initiating a communication signal to an interface in an interface module, wherein the communication signal comprises physical ID information of the interface;

an online interface identification unit, used for adding the physical ID information of the interface into an online queue under the condition of receiving response information of a slave device connected to the interface, wherein a probability that one interface in the online queue is initiated with a subsequent communication signal is higher than that of one interface in an idle queue; and a data information receiving unit, used for receiving data information transmitted by the slave device in the interface.

In another aspect of the present invention, provided is a data communication system, comprising:

a master device, an interface module and a slave device; wherein the interface module is connected with a plurality of interfaces, each interface is connected with one or more slave devices, and the master device performs data transmission with the slave devices through the interface module.

Compared with the prior art, the data communication method of the present application comprises the steps of initiating a communication signal to an interface in an interface module, wherein the communication signal comprises physical ID information of the interface; adding the physical ID information of the interface into an online queue under the condition of receiving response information of a slave device connected to the interface, wherein a probability that one interface in the online queue is initiated with a subsequent communication signal is higher than that of one interface in an idle queue; and receiving data information transmitted by the slave device in the interface. The master data communication device of the present application comprises a communication signal initiation unit, an online interface identification unit and a data information receiving unit which correspond to the steps of the above method. The method and the device of the present application can establish a communication network where simultaneous communication can be realized between a plurality of slave devices and receivers, wherein the communication network has high communication efficiency, can identify the working state of the newly connected slave device as soon as possible, and efficiently transmits data information of the slave device in the online state, and thus is simple in and convenient to physical implementation and connection.

The data communication system of the present application comprises the master device, the interface module and the plurality of slave devices connected to the interfaces in the interface module described above, wherein the master device of the system can efficiently and stably acquire the data information collected by the slave devices through the interface module.

BRIEF DESCRIPTION OF THE DRAWINGS

Other features, objectives and advantages of the present invention will become more apparent upon reading of the detailed description of non-limiting embodiments thereof, made with reference to the following drawings.

DESCRIPTION OF THE EMBODIMENTS

In order to enable those skilled in the art to better understand the technical solutions of the present application, the technical solutions in the embodiments of the present application will be clearly and completely described below with reference to the drawings in the embodiments of the present application. It is apparent that the described embodiments are only some, but not all, embodiments of the present application. Based on the embodiments in the present application, all other embodiments obtained by those of ordinary skill in the art without making any creative effort, fall within the protection scope of the present application.

It should be noted that the terms "first", "second" and the like in the description and claims of the present application and in the accompanying drawings are used for distinguishing between similar elements and are not necessarily used for describing a particular sequential or chronological order. It should be understood that the data so used may be interchanged under appropriate circumstances such that embodiments of the present application described herein can be implemented in sequences other than those illustrated or described herein. Moreover, the terms "comprises", "comprising", "include" "have" and "having" and any variations thereof are intended to cover a non-exclusive inclusion, such that processes, methods, systems, articles, or devices comprising a list of steps or units are not necessarily limited to those steps or units expressly listed, but may include other steps or units not expressly listed or inherent to these processes, methods, articles or devices.

Figure 1:
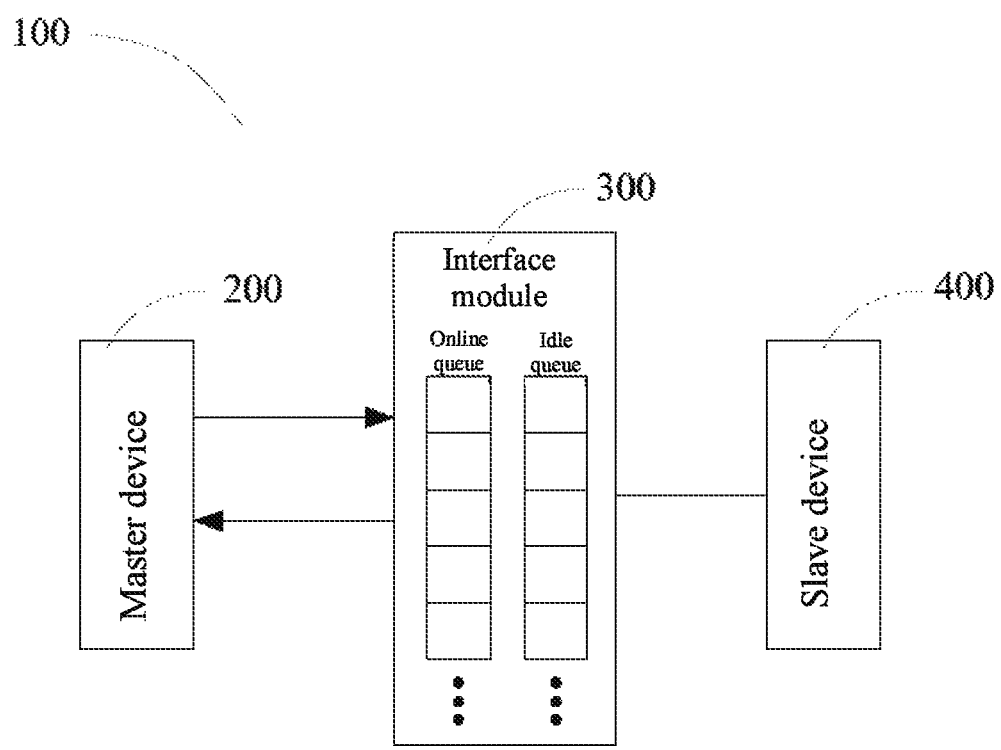
FIG. 1 is a functional block diagram of a data communication system according to an embodiment of the present application.

According to an aspect of the present application, provided is a communication system. Referring to FIG. 1, the system 100 comprises a master device 200, an interface module 300 and a slave device 400, wherein the interface module 300 is connected with a plurality of interfaces, each interface is connected with one or more slave devices, the master device performs data transmission with the slave devices through the interface module, and the communication method adopts a half-duplex two-way communication mode.

Specifically, the communication system 100 may be applied to the fields related to receivers of unmanned aerial vehicles and related information collection devices (for example, sensors and power supplies). Certainly, since the present application relates to a communication protocol, that is, a device-to-device data transmission method, the data transmission method of the present application is not limited to the field of unmanned aerial vehicles, and the devices belong to the protection scope of the present application if data transmission therebetween is performed by the data transmission method of the present application. Taking the field of unmanned aerial vehicles as an example, the master device 200 is a receiver, and the interface module 300 comprises a plurality of interfaces which are connected with the master device 200 and the slave device 400, wherein one interface can be connected with a plurality of slave devices so as to transmit data information acquired or collected by the slave device to the master device through the interfaces; the master device can transmit the data to a control unit or a remote controller of an unmanned aerial vehicle or other devices, so as to ensure that related parameter information of the unmanned aerial vehicle (for example, speed, height, acceleration, temperature, and electric quantity) is effectively and rapidly transmitted to the control unit or the remote controller of the unmanned aerial vehicle, so that the state of the unmanned aerial vehicle will be more efficiently understood to control the unmanned aerial vehicle's flight.

Figure 2:
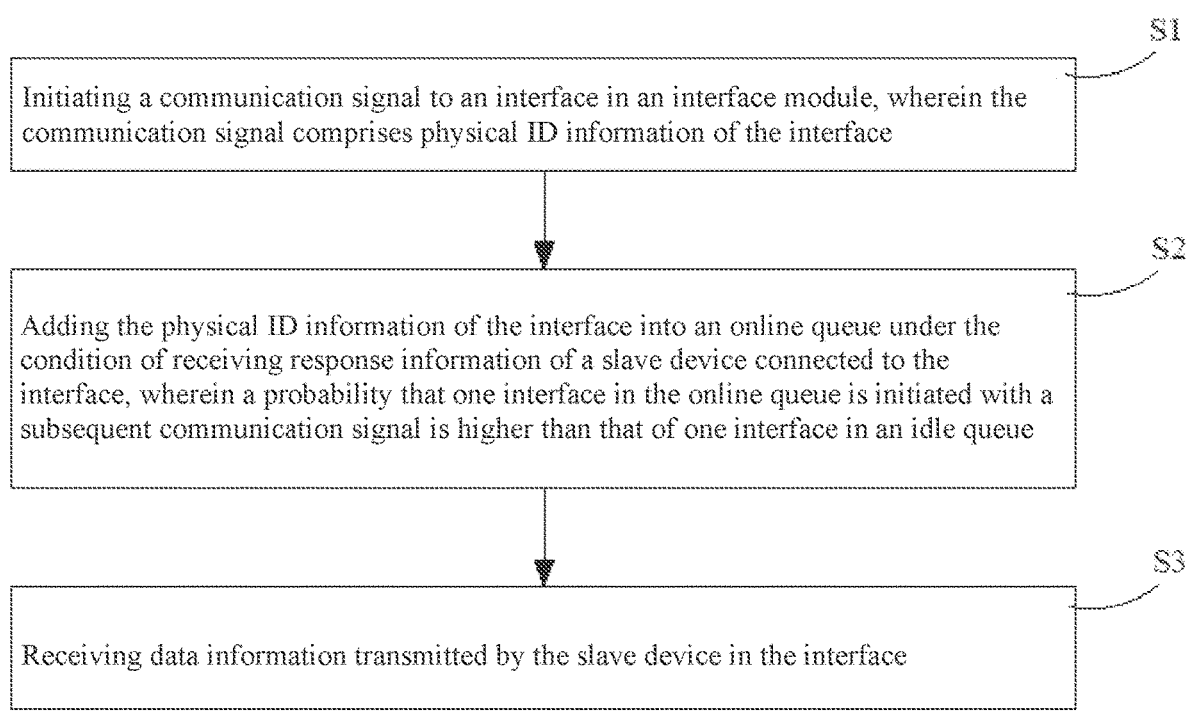
FIG. 2 is a flowchart of a data communication method at a master device according to an embodiment of the present application.

According to another aspect of the present application, provided is a data communication method at a master device, and referring to FIG. 2 in combination with FIG. 1, the method comprising:

S1, initiating a communication signal to an interface in an interface module, wherein the communication signal comprises physical ID information of the interface.

Specifically, data communication between the master device and the slave device is started by the master device which starts to initiate a communication signal to a certain interface in the interface module to initiate data communication; the master device initiates a communication signal to one interface in the interface module each time, and when the master device initiates a communication to this interface, the physical ID information of the interface is required to be one of contents of the initiated signal, wherein the physical ID information of the interface is a unique identification information of the interface. Furthermore, when the master device initiates a communication signal to an interface in the interface module, it needs to firstly determine physical ID information of the interface that is to be initiated with the communication signal, and if there is an online slave device in the corresponding interface, a communication connection is established between the device and the interface, and data information of the slave device connected to the interface is transmitted to the master device; otherwise, the master device initiates a communication signal to a next interface in the interface module.

S2, identifying whether the interface is online, adding the physical ID information of the interface into an online queue under the condition of receiving response information of a slave device 400 connected to the interface, wherein a probability that one interface in the online queue is initiated with a subsequent communication signal is higher than that of one interface in an idle queue, or a probability that an interface is in an offline state, i.e., a probability that an interface in an idle queue is initiated with a communication signal, is reduced.

Specifically, referring to FIG. 1, the master device divides the interfaces in the interface module into an online queue and an idle queue, wherein the online queue only represents the current state of one interface, and this state changes dynamically according to an actual condition of the interface, and wherein the interface responding to the communication signal initiated by the master device is positioned in the online queue, and otherwise, the interface is positioned in the idle queue.

In this step, adding the physical ID information of the interface into an online queue may comprise two cases: in the first case, when the current state of the interface is positioned in the idle queue, the interface needs to be added into the online queue; in the second case, whether a queue is the online queue or the idle queue, when the queue comprises more than two interfaces, the position relationship between the interfaces also affects the probability of the communication signal being initiated by the master device next time. Therefore, adding the physical ID information of the interface into an online queue further comprises adding the interface into a corresponding position in the online queue. If the current state of the interface is already positioned in the online queue, the interface needs to be added into the online queue again according to the actual condition, that is, the position of the interface in the online queue is adjusted.

In this embodiment, the master device of the present application initiates communication signals to the interfaces in the two queues generally according to an alternate sequence of these two queues, but in order to still transmit data of the slave device to the master device efficiently and orderly when a plurality of slave devices are connected to the system, the probability that the interface in the online queue is subsequently initiated with a communication signal is higher than that of the interface in the idle queue. Specifically, the probability may be determined according to the ratio of the number of interfaces in the online queue to the number of interfaces in the idle queue, and the number of probability times for initiating communication signals to the two queues may be determined according to the specific ratio, for example, when the ratio of the number of interfaces in the online queue to the number of interfaces in the idle queue is 5:3, in a 8-time communication signal initiation period, the master device is required to initiate a communication signal to the online queue for 5 times and initiate a communication signal to the idle queue for 3 times. Herein, it should be understood by those skilled in the art that the above determination method for the number of probability times for initiating communication signals to the two queues is only an example, and any other method that can determine the number of probability times for initiating communication signals to the two queues is within the protective scope of the present application as long as the requirement that the probability of initiating a communication signal to the online queue is higher than that of initiating a communication signal to the idle queue or that the probability of initiating a communication signal to an interface in an idle state is reduced is met.

S3, receiving data information transmitted by the slave device in the interface.

Specifically, the master device, after obtaining the response of the slave device, receives the data information of the slave device, and thus the data transmission period is completed.

Figure 3:
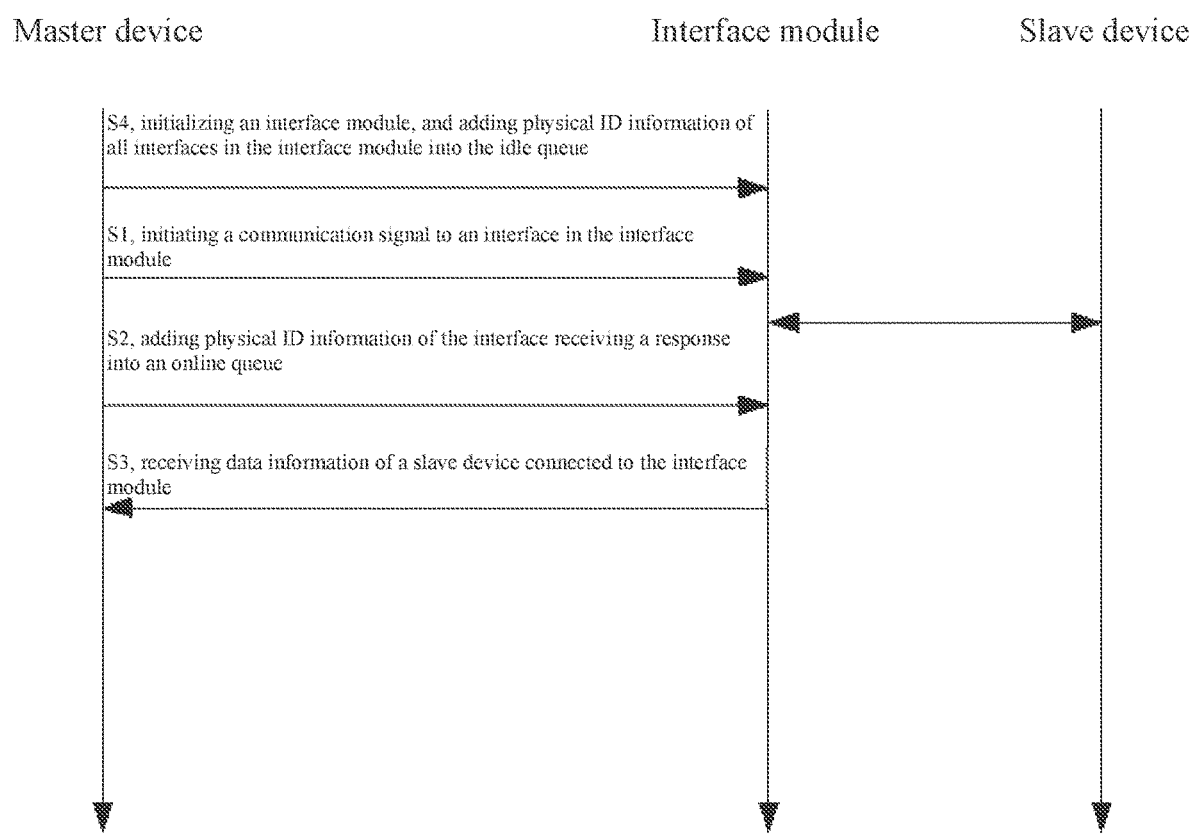
FIG. 3 is a flowchart of a data communication method according to an embodiment of the present application.

In some embodiments, referring to FIG. 3, before the step S1 the method further comprises:

S4, adding physical ID information of all interfaces in the interface module into the idle queue.

Specifically, referring to FIG. 3, in this embodiment, for the case when the data communication is started in an initialization state, all interfaces in the interface module need to be added into the idle queue at this time, that is, all interfaces are in an idle state by default, and then communication signals are firstly initiated to the interfaces in the idle queue.

Figure 4:
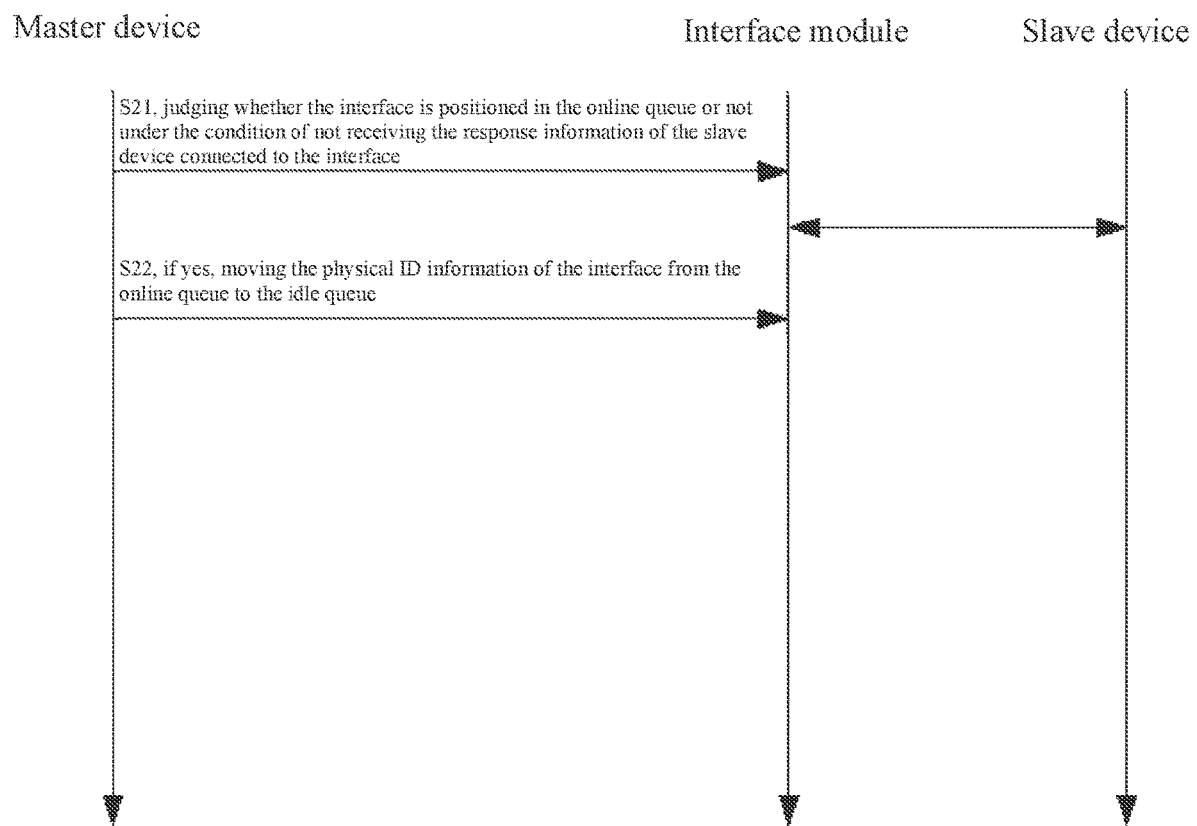
FIG. 4 is a flowchart of a data communication method according to another embodiment of the present application.

In some embodiments, referring to FIG. 4, the step S2 further comprises:

S21, judging whether the interface is positioned in the online queue or not under the condition of not receiving the response information of the slave device connected to the interface; and S22, if yes, moving the physical ID information of the interface from the online queue to the idle queue.

Specifically, this embodiment mainly aims at a condition that there is no response in the interface corresponding to the communication signal initiated by the master device, that is, the interface is in an idle state, and at this time, whether the interface is still positioned in the online queue or not needs to be checked, and if the interface needs to be moved to the idle queue from the online queue, the queue to which the interface belongs is adjusted at any time according to the latest state of the interface, so that the interface in the online queue is ensured to be in the online queue, and thus, data information of the slave device on the interface in the online queue is transmitted more efficiently.

In some embodiments, the step S1 comprises:

S11, (not shown) determining the pre-sending physical ID information of the corresponding interface in the interface module; and S12, (not shown) initiating the communication signal to the interface.

Specifically, in this embodiment, since the physical ID information of the interface is a unique identification information of the interface in the interface module, when the master device initiates a communication signal to an interface in the interface module, an interface object sent by the communication signal is identified by the physical ID information of the interface. Therefore, when the master device initiates a communication signal, it is necessary to determine the physical ID information of the interface corresponding to the initiated communication signal firstly.

Furthermore, the determination of the physical ID information of the interface corresponding to the initiated communication signal needs to be determined according to the preset communication signal initiation sequence of the interfaces in the idle queue and the online queue, and the specific determination method may comprise the following steps: firstly, adopting an alternate sequence of initiating communication signals to the interfaces in the idle queue and the online queue, that is, after a communication signal is initiated to an interface in the idle queue last time, a communication signal is initiated to an interface in the online queue next time; and secondly, dynamically adjusting the sequence of initiating communication signals to the two queues according to the dynamic ratio of the number of interfaces in the idle queue to the number of interfaces in the online queue, for example, when the ratio of the number of interfaces in the online queue to the number of interfaces in the idle queue is 7:3, in a 10-time communication signal initiation period, the master device is required to initiate a communication signal to the online queue for 7 times and initiate a communication signal to the idle queue for 3 times. Herein, it should be understood by those skilled in the art that the above determination method for the sequence of initiating communication signals to the two queues is only an example, and any other method that can determine the sequence of initiating communication signals to the two queues is within the protective scope of the present application as long as the requirement that the probability of initiating a communication signal to the online queue is higher than that of initiating a communication signal to the idle queue or that the probability of initiating a communication signal to an interface in an idle state is reduced is met.

More specifically, after the physical ID information of the interface initiated with the communication signal is determined, the master device may initiate the communication signal to the interface to determine whether the interface is in an online state or not, and if the interface is online, next steps of data transmission and the like may be performed.

In some embodiments, the step S11 comprises:

S111, (not shown) determining sequence information of the communication signal sent to the idle queue or the online queue according to a relationship between a number of the interfaces in the idle queue in the interface module and a number of the interfaces in the online queue in the interface module; and S112, (not shown) determining the physical ID information of the interface corresponding to the communication signal sent this time according to the sequence information.

In this embodiment, for the case where both the idle queue and the online queue have interfaces, in order to ensure that the probability that the interfaces in the online queue are initiated with communication signals is greater than that of the interfaces in the idle queue, the following specific implementation may be performed:

Firstly, initiating communication signals to the interfaces in the idle queue and the online queue according to an alternate sequence when a ratio of the number of the interfaces in the idle queue in the interface module to the number of the interfaces in the online queue in the interface module is greater than or equal to a first preset value. Specifically, the step mainly aims at a condition that the number of the interfaces in the idle queue is greater than the number of the interfaces in the online queue, and furthermore, the setting of the first preset value can be set according to requirements, and the relationship between the number of the interfaces in the idle queue and the number of the interfaces in the online queue needs to be considered for general settings. By way of example and without limitation, when the number of the interfaces in the idle queue is greater than the number of the interfaces in the online queue, the two queues are alternately initiated with communication signals, so that the probability that the interfaces in the online queue are initiated with communication signals can be ensured to be greater than that of the interfaces in the idle queue, and otherwise, when the number of the interfaces in the idle queue is less than the number of the interfaces in the online queue, an opportunity of initiating a communication signal needs to be more biased towards the interfaces in the online queue, otherwise, the probability that the interfaces in the online queue are initiated with communication signals cannot be ensured to be greater, and meanwhile, the importance of initiating communication signals to the interfaces in the idle queue also needs to be considered during the setting of the first preset value, and since if a new slave device is connected to an interface in the idle queue, this interface in the idle queue is activated and needs to be initiated with a communication signal so as to identify the presence of this slave device.

Secondly, initiating communication signals to the interfaces in the idle queue and the online queue according to a preset sequence corresponding to a ratio when the ratio of the number of the interfaces in the idle queue in the interface module to the number of the interfaces in the online queue in the interface module is less than or equal to a second preset value. Specifically, the step mainly aims at a condition that the number of the interfaces in the idle queue is less than the number of the interfaces in the online queue, and furthermore, the setting of the second preset value can be set according to requirements, and the relationship between the number of the interfaces in the idle queue and the number of the interfaces in the online queue needs to be considered for general settings. By way of example and without limitation, when the number of the interfaces in the idle queue is less than the number of the interfaces in the online queue, in order to ensure that the probability that the interfaces in the online queue are initiated with communication signals is greater than that of the interfaces in the idle queue, an opportunity of initiating a communication signal needs to be more biased towards the interfaces in the online queue, and otherwise, the probability that the interfaces in the online queue are initiated with communication signals cannot be ensured to be greater, and meanwhile, the importance of initiating communication signals to the interfaces in the idle queue also needs to be considered during the setting of the second present value, and since if a new slave device is connected to an interface in the idle queue, this interface in the idle queue is activated and needs to be initiated with a communication signal so as to identify the presence of this slave device.

Thirdly, determining the sequence of initiating communication signals to the interfaces in the idle queue and the online queue according to an initiation mode corresponding to the ratio of the number of the interfaces in the idle queue in the interface module to the number of the interfaces in the online queue in the interface module and the preset standard ratio. Specifically, the step mainly aims at a condition that since the total number of interfaces is large, the effect of controlling the sequence of initiating the communication signals to the idle queue and the online queue may be poor only through the first preset value and the second preset value, and it is necessary to add a plurality of gradients to the ratio of the number of the interfaces in the idle queue to the number of the interfaces in the online queue, and the preset standard corresponds to the communication signal initiation mode. The standard communication signal initiation mode corresponding to the ratio of the number of the interfaces in the idle queue to the number of the interfaces in the online queue is as follows, and the dynamic ratio of the number of the interfaces in the idle queue to the number of the interfaces in the online queue corresponds to the standard communication signal initiation mode. As shown in Table 1, the initiation mode corresponding to the preset standard ratio may be as follows:

TABLE 1

| Number of interfaces in the idle queue/ number of interfaces in the online queue | Ratio of number of times for which communication signals are initiated to the idle queue to number of times for which communication signals are initiated to the online queue |
| --- | --- |
| 0-0.5 (excluding 0.5) | 1:3 |
| 0.5-1 (including 1) | 1:2 |
| Greater than 1 | 1:1 |

Furthermore, the settings of the preset ratio range of the number of interfaces in the two queues and the communication signal initiation mode corresponding thereto are not limited, but the following factors need to be generally considered: first, a gradient of the standard communication signal initiation mode, that is, a gradient is divided into several levels, which needs to be based on the total number of interfaces and an expected effect that needs to be achieved, the more levels the gradient are divided into, the higher the probability that the interfaces are initiated with communication signals in the online queue can be ensured, but at the same time, if the mode by which the interfaces in the two queues are initiated with communication signals is adjusted too frequently, the efficiency and performance of the whole communication system may be affected, so that a setter needs to balance and set an appropriate number of gradient levels. Second, settings of the ratio of the number of interfaces in the idle queue to the number of interfaces in the online queue corresponding to each gradient level and the mode of initiating communication signals to the two queues corresponding thereto, which also need to be determined according to the actual total number of interfaces, the probability that the interfaces in the online queue are initiated with communication signals is greater than that of the interface in the idle queue, the necessity degree that the interfaces in the idle queue also need to be initiated with communication signals, and the like. For example, as shown in Table 1, when the ratio of the number of the interfaces in the idle queue in the interface module to the number of the interfaces in the online queue in the interface module is 0.8, the ratio of number of times for which communication signals are initiated to the idle queue to number of times for which communication signals are initiated to the online queue is 1:2, that is, in a three-time communication signal initiation period, a communication signal is initiated to an interface in the idle queue for 1 time, and a communication signal is initiated to an interface in the online queue for 2 times. Herein, it is further to be noted that the ratio of number of times for which communication signals are initiated to the idle queue to number of times for which communication signals are initiated to the online queue is the probability of initiating communication signals to the interfaces in the two queues, and does not represent the actual number of times of initiating the communication signals.

In some embodiments, the method further comprises:

S5, (not shown) presetting priority information of a plurality of slave devices connected to each interface in the interface module.

This embodiment mainly aims at the problem of receiving data information of which slave device when a plurality of slave devices are connected to an interface and are all online. Specifically, the priority information of the slave device is preset when this slave device is connected to the interface, wherein the priority information is priority information compared with other slave devices, and in an actual use process, different priority levels need to be set for different data parameters according to specific working environments of an unmanned aerial vehicle, user requirements and the like, and for example, if there is a match, information such as speed, height and acceleration of the unmanned aerial vehicle is more concerned, and if a landscape is photographed in a mountain area, information such as signal strength and positions of an unmanned aerial vehicle is more concerned. Herein, a user may set priority information of the slave device in advance as needed, and after the master device initiates a communication signal to an interface connecting with a plurality of slave devices, a slave device with a high priority may transmit its data information to the master device preferentially, so that the master device preferentially transmits data information that is most concerned by the user or most needed by the whole unmanned aerial vehicle system, wherein the priority presetting mode of the slave device is that a user determines priority information of each slave device according to an importance degree or a demand degree of parameters actually collected by the slave device, and configures the priority information to the corresponding slave device through the master device, and more specifically, the user generally sets the priority information corresponding to the slave device in advance through a related setting step of operating the master device or a device connected with the master device, wherein the device connected with the master device may be a computer side, a handheld device side or the like, for example, a computer, a mobile phone or a remote controller, and the master device collects the priority information of the slave device and configures the information to the corresponding slave device to complete the priority setting of the slave device.

In some embodiments, the method further comprises:

S6, (not shown) modifying the preset priority information of the slave devices.

This embodiment mainly aims at the condition that the priority of the slave devices needs to be modified, generally, a user can adjust the priority information of the slave device at any time according to requirements in a process of actually using an unmanned aerial vehicle system, and furthermore, the user can adjust the priority information by operating a corresponding interface on a remote controller of the unmanned aerial vehicle, the remote controller being connected with the master equipment, and after the remote controller collects priority adjustment information of the corresponding slave device by the user, the adjustment information is transmitted to the master device, and the master device configures the priority adjustment information to the corresponding slave device, so that the priority information of the slave device is adjusted according to the actual requirement; the priority of the slave device may also be adjusted by other devices connected with the master device, for example, a computer side, a handheld device side, or the like, and the master device collects the priority adjustment information of the slave device and configures the information to the corresponding slave device to complete the adjustment of the priority of the slave device.

In some embodiments, when a plurality of slave devices are in an effective response state in the interface, the step S3 comprises:

S31, (not shown) determining a slave device with a highest priority according to priority information of the plurality of slave devices in the effective response state; and S32, (not shown) receiving data information of the slave device with the highest priority.

Specifically, the priority information of the slave device represents priority sequence information of data of the slave device received by the master device, that is, a sequence in which the master device receives data information of a plurality of slave devices when the plurality of slave devices are all in an effective response state; furthermore, the priority information may be period information of an initiated communication signal, for example, the highest priority is 1 period, and the second highest priority is 2 periods, which means that the slave device with the highest priority gives up the next accessed opportunity to the slave device with the second highest priority after transmitting data to the master device.

In some embodiments, a data communication content comprises:

a frame header; a physical ID; a command type; an application ID; a data value; and a check bit. Specifically, the physical ID is identification information of an interface in the interface module, the command type is command information including different instructions such as reading, writing, resetting and diagnosis, the application ID is application information corresponding to the slave device, such as speed and temperature, the data value is specific content information of data transmission, such as the current electric quantity and the current temperature, and the check bit is used for checking data transmission.

In some embodiments, a corresponding command is sent to the slave device of the interface according to the command type information.

In the half-duplex two-way communication mode adopted in the data communication method described in the present application, the master device sends corresponding command information to the slave device through the interface in the interface module by using the command type information when necessary, for example, modifying priority information of the slave device, sending a temporary disable command to the slave device, and sending a reset command to the slave device. Herein, after receiving the command information sent by the master device, the corresponding slave device enters into a configuration state, and after the configuration is completed, the corresponding slave device exits the configuration state and transitions into a normal operating state.

In some embodiments, adding physical ID information of the interface into an online queue comprises: determining position information of the interface in the online queue according to priority information of the interface; and adding the interface into a corresponding position of the online queue.

Specifically, generally, after an interface in the idle queue is initiated with a communication signal, if there is a response, the interface is added in the online queue, for example, at a tail part of the online queue, and if there is no response, the interface is still added into the idle queue, for example, a tail part of the idle queue; after the interface in the online queue is initiated with a communication signal, if there is a response, the interface is still added into the online queue, for example, a tail part of the online queue; and if there is no response, the interface is moved to the idle queue, for example, a tail part of the idle queue. However, when the master device initiates a communication signal to an interface in the queue, the communication signal is initiated to a foremost interface in the corresponding idle queue or the corresponding online queue, so when the online queue and the idle queue comprise a plurality of interfaces, the interface positions in each queue need to be considered.

Specifically, similar to slave devices having priorities, interfaces in the queues also have priorities, with an interface having a higher priority that may be added at a front position in the corresponding queue to be more quickly initiated with a communication signal, increasing the probability of this interface being accessed. By way of example and without limitation, if a slave device is not connected to an interface of an idle queue for a long time, the priority of this interface in the idle queue can be set to be low, so that the time for accessing the interface repeatedly at each time can be saved. However, the interface is not completely abandoned, and a communication signal can be initiated after the interface is connected with a slave device.

In some embodiments, adding physical ID information of the interface into an online queue comprises: adding the interface into a tail part of the online queue.

Specifically, under the condition that there is a response in the interface, the physical ID information corresponding to the interface is added into the online queue, and the sequence of the interfaces in the online queue is arranged, that is, the sequence of the interfaces in the online queue is taken as the sequence of the initiated communication signals, and therefore, when one interface is added to the online queue, the interface is added into the tail part of the online queue by default, so as to avoid that some interfaces are repeatedly accessed for many times and some interfaces are not accessed.

Compared with the prior art, the data communication method of the present application comprises the steps of initiating a communication signal to an interface in an interface module, wherein the communication signal comprises physical ID information of the interface; adding the physical ID information of the interface into an online queue under the condition of receiving response information of a slave device connected to the interface, wherein a probability that an interface in the online queue is initiated with a subsequent communication signal is higher than that of an interface in an idle queue; and receiving data information transmitted by the slave device in the interface. The master data communication device of the present application comprises a communication signal initiation unit, an online interface identification unit and a data information receiving unit which correspond to the steps of the above method. The method and the device of the present application can establish a communication network where simultaneous communication can be realized between a plurality of slave devices and receivers, wherein the communication network has high communication efficiency, can identify the working state of the newly connected slave device as soon as possible, and efficiently transmits data information of the slave device in the online state, and thus is simple in and convenient to physical implementation and connection.

The data communication system of the present application comprises the master device, the interface module and the plurality of slave devices connected to the interfaces in the interface module described above, wherein the master device of the system can efficiently and stably acquire the data information collected by the slave devices through the interface module.

Figure 5:
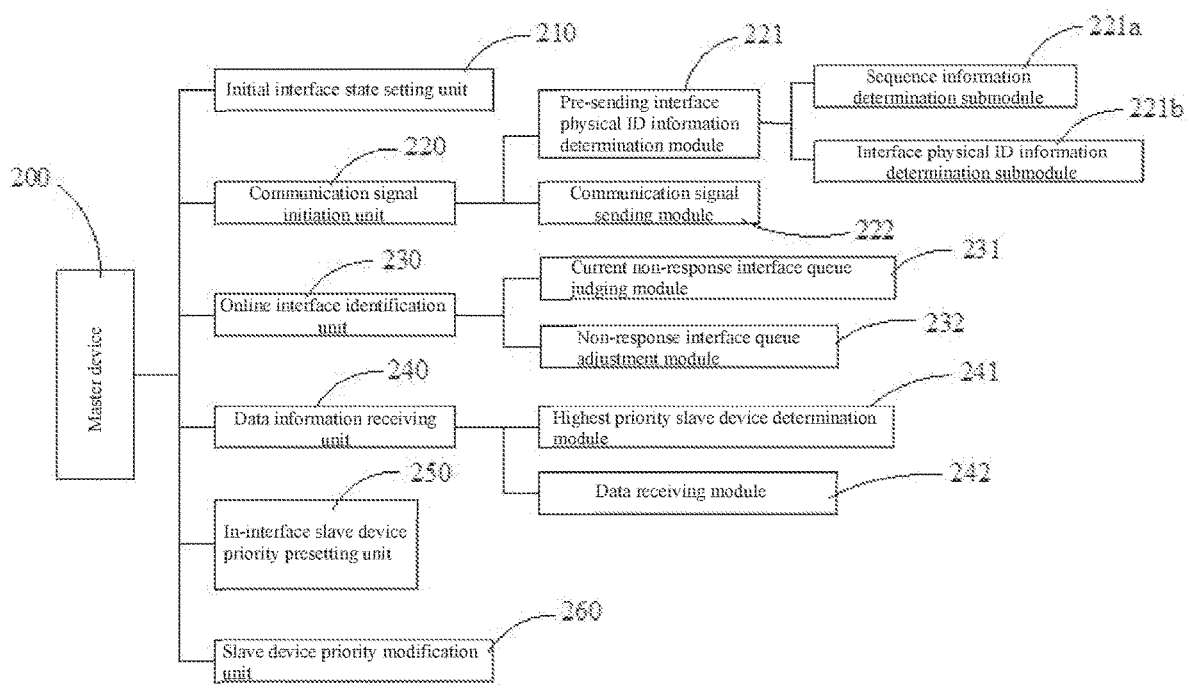
FIG. 5 is a functional block diagram of a master device for data communication according to an embodiment of the present application.

Referring to FIG. 5, according to another aspect of the present application, the present application further provides a master device for data communication, wherein the master device 200 comprises:

A communication signal initiation unit 220, used for initiating a communication signal to an interface in an interface module, wherein the communication signal comprises physical ID information of the interface.

Specifically, data communication between the master device and the slave device is started by the master device which starts to initiate a communication signal to a certain interface in the interface module to initiate data communication; the master device initiates a communication signal to one interface in the interface module each time, and when the master device initiates a communication to this interface, the physical ID information of the interface is required to be one of contents of the initiated signal, wherein the physical ID information of the interface is a unique identification information of the interface. Furthermore, when the master device initiates a communication signal to an interface in the interface module, it needs to firstly determine physical ID information of the interface that is to be initiated with the communication signal, and if there is an online slave device in the corresponding interface, a communication connection is established between the device and the interface, and data information of the slave device connected to the interface is transmitted to the master device; otherwise, the master device initiates a communication signal to a next interface in the interface module.

An online interface identification unit 230, used for identifying whether the interface is online, adding the physical ID information of the interface into an online queue under the condition of receiving response information of a slave device connected to the interface, wherein a probability that one interface in the online queue is initiated with a subsequent communication signal is higher than that of one interface in an idle queue.

Specifically, referring to FIG. 5, the master device divides the interfaces in the interface module into an online queue and an idle queue, wherein the online queue only represents the current state of one interface, and this state changes dynamically according to an actual condition of the interface, and wherein the interface responding to the communication signal initiated by the master device is positioned in the online queue, and otherwise, the interface is positioned in the idle queue.

Specifically, adding the physical ID information of the interface into an online queue may comprise two cases: in the first case, when the current state of the interface is positioned in the idle queue, the interface needs to be added into the online queue; in the second case, whether a queue is the online queue or the idle queue, when the queue comprises more than two interfaces, the position relationship between the interfaces also affects the probability of the communication signal being initiated by the master device next time. Therefore, adding the physical ID information of the interface into an online queue further comprises adding the interface into a corresponding position in the online queue. If the current state of the interface is already positioned in the online queue, the interface needs to be added into the online queue again according to the actual condition, that is, the position of the interface in the online queue is adjusted.

In this embodiment, the master device of the present application initiates communication signals to the interfaces in the two queues generally according to an alternate sequence of these two queues, but in order to still transmit data of the slave device to the master device efficiently and orderly when a plurality of slave devices are connected to the system, the probability that the interface in the online queue is subsequently initiated with a communication signal is higher than that of the interface in the idle queue. Specifically, the probability may be determined according to the ratio of the number of interfaces in the online queue to the number of interfaces in the idle queue, and the number of probability times for initiating communication signals to the two queues may be determined according to the specific ratio, for example, when the ratio of the number of interfaces in the online queue to the number of interfaces in the idle queue is 5:3, in a 8-time communication signal initiation period, the master device is required to initiate a communication signal to the online queue for 5 times and initiate a communication signal to the idle queue for 3 times. Herein, it should be understood by those skilled in the art that the above determination method for the number of probability times for initiating communication signals to the two queues is only an example, and any other method that can determine the number of probability times for initiating communication signals to the two queues is within the protective scope of the present application as long as the requirement that the probability of initiating a communication signal to the online queue is higher than that of initiating a communication signal to the idle queue or that the probability of initiating a communication signal to an interface in an idle state is reduced is met.

A data information receiving unit 240, used for receiving data information transmitted by the slave device in the interface.

Specifically, the master device, after obtaining the response of the slave device, receives the data information of the slave device, and thus the data transmission period is completed.

In some embodiments, the master device further comprises:

An initial interface state setting unit 210, used for adding physical ID information of all interfaces in the interface module into the idle queue.

Specifically, referring to FIG. 5, in this embodiment, for the case when the data communication is started in an initialization state, all interfaces in the interface module need to be added into the idle queue at this time, that is, all interfaces are in an idle state by default, and then communication signals are firstly initiated to the interfaces in the idle queue.

In some embodiments, referring to FIG. 5, the online interface identification unit 230 further comprises:

a current non-response interface queue judging module 231, used for judging whether the interface is positioned in the online queue or not under the condition of not receiving the response information of the slave device connected to the interface; and if yes, a non-response interface queue adjustment module 232, used for moving the physical ID information of the interface from the online queue to the idle queue.

Specifically, this embodiment mainly aims at a condition that there is no response in the interface corresponding to the communication signal initiated by the master device, that is, the interface is in an idle state, and at this time, whether the interface is still positioned in the online queue or not needs to be checked, and if the interface needs to be moved to the idle queue from the online queue, the queue to which the interface belongs is adjusted at any time according to the latest state of the interface, so that the interface in the online queue is ensured to be in the online queue, and thus, data information of the slave device on the interface in the online queue is transmitted more efficiently.

In some embodiments, the communication signal initiation unit comprises:

a pre-sending interface physical ID information determination module 221, used for determining the pre-sending physical ID information of the corresponding interface in the interface module; and a communication signal sending module 222, used for initiating the communication signal to the interface.

Specifically, in this embodiment, since the physical ID information of the interface is a unique identification information of the interface in the interface module, when the master device initiates a communication signal to an interface in the interface module, an interface object sent by the communication signal is identified by the physical ID information of the interface. Therefore, when the master device initiates a communication signal, it is necessary to determine the physical ID information of the interface corresponding to the initiated communication signal firstly.

Furthermore, the determination of the physical ID information of the interface corresponding to the initiated communication signal needs to be determined according to the preset communication signal initiation sequence of the interfaces in the idle queue and the online queue, and the specific determination method may comprise the following steps: firstly, adopting an alternate sequence of initiating communication signals to the interfaces in the idle queue and the online queue, that is, after a communication signal is initiated to an interface in the idle queue last time, a communication signal is initiated to an interface in the online queue next time; and secondly, dynamically adjusting the sequence of initiating communication signals to the two queues according to the dynamic ratio of the number of interfaces in the idle queue to the number of interfaces in the online queue, for example, when the ratio of the number of interfaces in the online queue to the number of interfaces in the idle queue is 7:3, in a 10-time communication signal initiation period, the master device is required to initiate a communication signal to the online queue for 7 times and initiate a communication signal to the idle queue for 3 times. Herein, it should be understood by those skilled in the art that the above determination method for the sequence of initiating communication signals to the two queues is only an example, and any other method that can determine the sequence of initiating communication signals to the two queues is within the protective scope of the present application as long as the requirement that the probability of initiating a communication signal to the online queue is higher than that of initiating a communication signal to the idle queue or that the probability of initiating a communication signal to an interface in an idle state is reduced is met.

More specifically, after the physical ID information of the interface initiated with the communication signal is determined, the master device may initiate the communication signal to the interface to determine whether the interface is in an online state or not, and if the interface is online, next steps of data transmission and the like may be performed.

In some embodiments, the pre-sending interface physical ID information determination module 221 comprises:

a sequence information determination submodule 221a, used for determining sequence information of the communication signal sent to the idle queue or the online queue according to a relationship between a number of the interfaces positioned in the idle queue in the interface module and a number of the interfaces positioned in the online queue in the interface module; and an interface physical ID information determination submodule 221b, used for determining the physical ID information of the interface corresponding to the communication signal sent this time according to the sequence information.

The sequence information determination submodule 221a comprises:

a first sequence information determination submodule (not shown), used for sending communication signals to the interfaces in the idle queue and the online queue according to an alternate sequence when a ratio of the number of the interfaces in the idle queue in the interface module to the number of the interfaces in the online queue in the interface module is greater than or equal to a first preset value.

The sequence information determination submodule 221a comprises:

a second sequence information determination submodule (not shown), used for sending communication signals to the interfaces in the idle queue and the online queue according to a preset sequence corresponding to a ratio when the ratio of the number of the interfaces in the idle queue in the interface module to the number of the interfaces in the online queue in the interface module is less than or equal to a second preset value.

In this embodiment, for the case where both the idle queue and the online queue have interfaces, in order to ensure that the probability that the interfaces in the online queue are initiated with communication signals is greater than that of the interfaces in the idle queue, the following specific implementation may be performed:

Firstly, initiating communication signals to the interfaces in the idle queue and the online queue according to an alternate sequence when a ratio of the number of the interfaces in the idle queue in the interface module to the number of the interfaces in the online queue in the interface module is greater than or equal to a first preset value. Specifically, the step mainly aims at a condition that the number of the interfaces in the idle queue is greater than the number of the interfaces in the online queue, and furthermore, the setting of the first preset value can be set according to requirements, and the relationship between the number of the interfaces in the idle queue and the number of the interfaces in the online queue needs to be considered for general settings. By way of example and without limitation, when the number of the interfaces in the idle queue is greater than the number of the interfaces in the online queue, the two queues are alternately initiated with communication signals, so that the probability that the interfaces in the online queue are initiated with communication signals can be ensured to be greater than that of the interfaces in the idle queue, and otherwise, when the number of the interfaces in the idle queue is less than the number of the interfaces in the online queue, an opportunity of initiating a communication signal needs to be more biased towards the interfaces in the online queue, otherwise, the probability that the interfaces in the online queue are initiated with communication signals cannot be ensured to be greater, and meanwhile, the importance of initiating communication signals to the interfaces in the idle queue also needs to be considered during the setting of the first preset value, and since if a new slave device is connected to an interface in the idle queue, this interface in the idle queue is activated and needs to be initiated with a communication signal so as to identify the presence of this slave device.

Secondly, initiating communication signals to the interfaces in the idle queue and the online queue according to a preset sequence corresponding to a ratio when the ratio of the number of the interfaces in the idle queue in the interface module to the number of the interfaces in the online queue in the interface module is less than or equal to a second preset value. Specifically, the step mainly aims at a condition that the number of the interfaces in the idle queue is less than the number of the interfaces in the online queue, and furthermore, the setting of the second preset value can be set according to requirements, and the relationship between the number of the interfaces in the idle queue and the number of the interfaces in the online queue needs to be considered for general settings. By way of example and without limitation, when the number of the interfaces in the idle queue is less than the number of the interfaces in the online queue, in order to ensure that the probability that the interfaces in the online queue are initiated with communication signals is greater than that of the interfaces in the idle queue, an opportunity of initiating a communication signal needs to be more biased towards the interfaces in the online queue, and otherwise, the probability that the interfaces in the online queue are initiated with communication signals cannot be ensured to be greater, and meanwhile, the importance of initiating communication signals to the interfaces in the idle queue also needs to be considered during the setting of the second present value, and since if a new slave device is connected to an interface in the idle queue, this interface in the idle queue is activated and needs to be initiated with a communication signal so as to identify the presence of this slave device.

Thirdly, determining the sequence of initiating communication signals to the interfaces in the idle queue and the online queue according to an initiation mode corresponding to the ratio of the number of the interfaces in the idle queue in the interface module to the number of the interfaces in the online queue in the interface module and the preset standard ratio. Specifically, the step mainly aims at a condition that since the total number of interfaces is large, the effect of controlling the sequence of initiating the communication signals to the idle queue and the online queue may be poor only through the first preset value and the second preset value, and it is necessary to add a plurality of gradients to the ratio of the number of the interfaces in the idle queue to the number of the interfaces in the online queue, and the preset standard corresponds to the communication signal initiation mode. The standard communication signal initiation mode corresponding to the ratio of the number of the interfaces in the idle queue to the number of the interfaces in the online queue is as follows, and the dynamic ratio of the number of the interfaces in the idle queue to the number of the interfaces in the online queue corresponds to the standard communication signal initiation mode. As shown in Table 2, the initiation mode corresponding to the preset standard ratio may be as follows:

TABLE 1

| Number of interfaces in the idle queue/ number of interfaces in the online queue | Ratio of number of times for which communication signals are initiated to the idle queue to number of times for which communication signals are initiated to the online queue |
|---|---|
| 0-0.5 (excluding 0.5) | 1:3 |
| 0.5-1 (including 1) | 1:2 |
| Greater than 1 | 1:1 |

Furthermore, the settings of the preset ratio range of the number of interfaces in the two queues and the communication signal initiation mode corresponding thereto are not limited, but the following factors need to be generally considered: first, a gradient of the standard communication signal initiation mode, that is, a gradient is divided into several levels, which needs to be based on the total number of interfaces and an expected effect that needs to be achieved, the more levels the gradient are divided into, the higher the probability that the interfaces are initiated with communication signals in the online queue can be ensured, but at the same time, if the mode by which the interfaces in the two queues are initiated with communication signals is adjusted too frequently, the efficiency and performance of the whole communication system may be affected, so that a setter needs to balance and set an appropriate number of gradient levels. Second, settings of the ratio of the number of interfaces in the idle queue to the number of interfaces in the online queue corresponding to each gradient level and the mode of initiating communication signals to the two queues corresponding thereto, which also need to be determined according to the actual total number of interfaces, the probability that the interfaces in the online queue are initiated with communication signals is greater than that of the interface in the idle queue, the necessity degree that the interfaces in the idle queue also need to be initiated with communication signals, and the like. For example, as shown in Table 1, when the ratio of the number of the interfaces in the idle queue in the interface module to the number of the interfaces in the online queue in the interface module is 0.8, the ratio of number of times for which communication signals are initiated to the idle queue to number of times for which communication signals are initiated to the online queue is 1:2, that is, in a three-time communication signal initiation period, a communication signal is initiated to an interface in the idle queue for 1 time, and a communication signal is initiated to an interface in the online queue for 2 times. Herein, it is further to be noted that the ratio of number of times for which communication signals are initiated to the idle queue to number of times for which communication signals are initiated to the online queue is the probability of initiating communication signals to the interfaces in the two queues, and does not represent the actual number of times of initiating the communication signals.

In some embodiments, the master device 200 further comprises:

an in-interface slave device priority presetting unit 250, used for presetting priority information of a plurality of slave devices connected to each interface in the interface module.

This embodiment mainly aims at the problem of receiving data information of which slave device when a plurality of slave devices are connected to an interface and are all online. Specifically, the priority information of the slave device is preset when this slave device is connected to the interface, wherein the priority information is priority information compared with other slave devices, and in an actual use process, different priority levels need to be set for different data parameters according to specific working environments of an unmanned aerial vehicle, user requirements and the like, and for example, if there is a match, information such as speed, height and acceleration of the unmanned aerial vehicle is more concerned, and if a landscape is photographed in a mountain area, information such as signal strength and positions of an unmanned aerial vehicle is more concerned. Herein, a user may set priority information of the slave device in advance as needed, and after the master device initiates a communication signal to an interface connecting with a plurality of slave devices, a slave device with a high priority may transmit its data information to the master device preferentially, so that the master device preferentially transmits data information that is most concerned by the user or most needed by the whole unmanned aerial vehicle system, wherein the priority presetting mode of the slave device is that a user determines priority information of each slave device according to an importance degree or a demand degree of parameters actually collected by the slave device, and configures the priority information to the corresponding slave device through the master device, and more specifically, the user generally sets the priority information corresponding to the slave device in advance through a related setting step of operating the master device or a device connected with the master device, wherein the device connected with the master device may be a computer side, a handheld device side or the like, for example, a computer, a mobile phone or a remote controller, and the master device collects the priority information of the slave device and configures the information to the corresponding slave device to complete the priority setting of the slave device.

In some embodiments, the master device further comprises:

a slave device priority modification unit 260, used for modifying the preset priority information of the slave devices.

This embodiment mainly aims at the condition that the priority of the slave devices needs to be modified, generally, a user can adjust the priority information of the slave device at any time according to requirements in a process of actually using an unmanned aerial vehicle system, for example, the user can adjust the priority information by operating a corresponding interface on a remote controller of the unmanned aerial vehicle, the remote controller being connected with the master equipment, and after the remote controller collects priority adjustment information of the corresponding slave device by the user, the adjustment information is transmitted to the master device, and the master device configures the priority adjustment information to the corresponding slave device, so that the priority information of the slave device is adjusted according to the actual requirement; the priority of the slave device may also be adjusted by other devices connected with the master device, for example, a computer side, a handheld device side, or the like, and the master device collects the priority adjustment information of the slave device and configures the information to the corresponding slave device to complete the adjustment of the priority of the slave device.

In some embodiments, when a plurality of slave devices are in an effective response state in the interface, the data information receiving unit 240 comprises:

a highest priority slave device determination module 241, used for determining a slave device with a highest priority according to priority information of the plurality of slave devices in the effective response state; and a data receiving module 242, used for receiving data information of the slave device with the highest priority.

Specifically, the priority information of the slave device represents priority sequence information of data of the slave device received by the master device, that is, a sequence in which the master device receives data information of a plurality of slave devices when the plurality of slave devices are all in an effective response state; furthermore, the priority information may be period information of an initiated communication signal, for example, the highest priority is 1 period, and the second highest priority is 2 periods, which means that the slave device with the highest priority gives up the next accessed opportunity to the slave device with the second highest priority after transmitting data to the master device.

In some embodiments, a data communication content comprises:

a frame header; a physical ID; a command type; an application ID; a data value; and a check bit. Specifically, the physical ID is identification information of an interface in the interface module, the command type is command information including different instructions such as reading, writing, resetting and diagnosis, the application ID is application information corresponding to the slave device, such as speed and temperature, the data value is specific content information of data transmission, such as the current electric quantity and the current temperature, and the check bit is used for checking data transmission.

In some embodiments, a corresponding command is sent to the slave device of the interface according to the command type information.

In the half-duplex two-way communication mode adopted in the data communication method described in the present application, the master device sends corresponding command information to the slave device through the interface in the interface module by using the command type information when necessary, for example, modifying priority information of the slave device, sending a temporary disable command to the slave device, and sending a reset command to the slave device. Herein, after receiving the command information sent by the master device, the corresponding slave device enters into a configuration state, and after the configuration is completed, the corresponding slave device exits the configuration state and transitions into a normal operating state.

In some embodiments, adding physical ID information of the interface into an online queue comprises:
determining position information of the interface in the online queue according to priority information of the interface; and
adding the interface into a corresponding position of the online queue.

Specifically, generally, after an interface in the idle queue is initiated with a communication signal, if there is a response, the interface is added in the online queue, for example, at a tail part of the online queue, and if there is no response, the interface is still added into the idle queue, for example, a tail part of the idle queue; after the interface in the online queue is initiated with a communication signal, if there is a response, the interface is still added into the online queue, for example, a tail part of the online queue; and if there is no response, the interface is moved to the idle queue, for example, a tail part of the idle queue. However, when the master device initiates a communication signal to an interface in the queue, the communication signal is initiated to a foremost interface in the corresponding idle queue or the corresponding online queue, so when the online queue and the idle queue comprise a plurality of interfaces, the interface positions in each queue need to be considered.

Specifically, similar to slave devices having priorities, interfaces in the queues also have priorities, with an interface having a higher priority that may be added at a front position in the corresponding queue to be more quickly initiated with a communication signal, increasing the probability of this interface being accessed. By way of example and without limitation, if a slave device is not connected to an interface of an idle queue for a long time, the priority of this interface in the idle queue can be set to be low, so that the time for accessing the interface repeatedly at each time can be saved. However, the interface is not completely abandoned, and a communication signal can be initiated after the interface is connected with a slave device.

In some embodiments, adding physical ID information of the interface into an online queue comprises: adding the interface into a tail part of the online queue.

Specifically, under the condition that there is a response in the interface, the physical ID information corresponding to the interface is added into the online queue, and the sequence of the interfaces in the online queue is arranged, that is, the sequence of the interfaces in the online queue is taken as the sequence of the initiated communication signals, and therefore, when one interface is added to the online queue, the interface is added into the tail part of the online queue by default, so as to avoid that some interfaces are repeatedly accessed for many times and some interfaces are not accessed.

Compared with the prior art, the data communication method of the present application comprises the steps of initiating a communication signal to an interface in an interface module, wherein the communication signal comprises physical ID information of the interface; adding the physical ID information of the interface into an online queue under the condition of receiving response information of a slave device connected to the interface, wherein a probability that an interface in the online queue is initiated with a subsequent communication signal is higher than that of an interface in an idle queue; and receiving data information transmitted by the slave device in the interface. The master data communication device of the present application comprises a communication signal initiation unit, an online interface identification unit and a data information receiving unit which correspond to the steps of the above method. The method and the device of the present application can establish a communication network where simultaneous communication can be realized between a plurality of slave devices and receivers, wherein the communication network has high communication efficiency, can identify the working state of the newly connected slave device as soon as possible, and efficiently transmits data information of the slave device in the online state, and thus is simple in and convenient to physical implementation and connection.

The data communication system of the present application comprises the master device, the interface module and the plurality of slave devices connected to the interfaces in the interface module described above, wherein the master device of the system can efficiently and stably acquire the data information collected by the slave devices through the interface module.

The above-mentioned serial numbers of the embodiments of the present application are merely for description and do not represent the advantages and disadvantages of the embodiments.

In the above-mentioned embodiments of the present application, the descriptions of the embodiments have their respective emphasis, and for portions that are not described in detail in a certain embodiment, reference may be made to the related descriptions of other embodiments.

In some embodiments provided in the present application, it should be understood that the disclosed technical content can be implemented in other manners. The above-described apparatus embodiments are merely illustrative, and for example, the division of the units may be a logical division, and for actual implementation, there may be another division, for example, multiple units or components may be combined or may be integrated into another system, or some features may be omitted, or may not be executed. In addition, the shown or discussed coupling or direct coupling or communication connection between each other may be an indirect coupling or communication connection through some interfaces, units or modules, and may be electrical or in other forms.

The units described as separate parts may or may not be physically separate, and parts displayed as units may or may not be physical units, i.e., may be positioned in one position, or may be distributed onto a plurality of units. Some or all of the units can be selected according to actual requirements to achieve the purpose of the solution of this embodiment.

In addition, functional units in the embodiments of the present application may be integrated into one processing unit, or each unit may exist alone physically, or two or more units may be integrated into one unit. The integrated unit may be implemented in the form of hardware, or may also be implemented in the form of a software functional unit.

The integrated unit, if implemented in the form of a software functional unit and sold or used as a separate product, may be stored in a computer readable storage medium. Based on such an understanding, the technical solution of the present application essentially, or the part contributing to the prior art, or all or a part of the technical solution may be implemented in the form of a software product. The software product is stored in a storage medium and comprises several instructions for instructing a computer device (which may be a personal computer, a server, or a network device) to perform all or a part of the steps of the method described in the embodiments of the present invention. However, the above-mentioned storage medium includes: a U-disk, a read-only memory (ROM), a random access memory (RAM), a removable hard disk, a magnetic disk, or an optical disk, and various media capable of storing program codes.

The above is merely preferred embodiments of the present application, and it should be noted that it will be apparent to those skilled in the art that the present application is not limited to the details of the above-mentioned exemplary embodiments and that the present application can be implemented in other specific forms without departing from the spirit or basic characteristics thereof. Therefore, the embodiments are to be considered in all respects as illustrative and not restrictive, and the scope of the present application is indicated by the appended claims rather than by the above-mentioned description, and thus all changes which come within the meaning and range of equivalency of the claims are intended to be embraced therein. Any reference numeral in the claims should not be construed as limiting the claims concerned. Furthermore, it will be obvious that the term "comprises" or "comprising" does not exclude other units or steps, and the singular form does not exclude the plural form. A plurality of units or apparatuses recited in the apparatus claims may also be implemented by one unit or apparatus in the form of software or hardware. The terms "first", "second", etc. are used to represent names and do not represent any particular sequence.

What is claimed is:

1. A data communication method at a master device, comprising:
    initiating a communication signal to an interface in an interface module, wherein the communication signal comprises physical ID information of the interface, and initiating the communication signal to the interface in the interface module comprises:
        determining a pre-sending physical ID information of a corresponding interface in the interface module, comprising:
            determining sequence information of the communication signal sent to an idle queue or an online queue according to a relationship between a number of the interfaces positioned in the idle queue in the interface module and a number of the interfaces positioned in the online queue in the interface module; and
            determining the physical ID information of the interface corresponding to the communication signal sent this time according to the sequence information; and
        initiating the communication signal to the interface;
    identifying whether the interface is online, adding the physical ID information of the interface into the online queue under the condition of receiving response information of a slave device connected to the interface, wherein a probability that one interface in the online queue is initiated with a subsequent communication signal is higher than that of one interface in the idle queue; and
    receiving data information transmitted by the slave device in the interface.

2. The method according to claim 1, wherein, before initiating the communication signal to the interface in the interface module, the method further comprises:
    adding physical ID information of all interfaces in the interface module into the idle queue.

3. The method according to claim 1, wherein identifying whether the interface is online further comprises:
    judging whether the interface is positioned in the online queue or not under a condition of not receiving the response information of the slave device connected to the interface; and
    if yes, moving the physical ID information of the interface from the online queue to the idle queue.

4. The method according to claim 1, wherein determining sequence information of the communication signal sent to the idle queue or the online queue according to the relationship between the number of the interfaces positioned in the idle queue in the interface module and the number of the interfaces positioned in the online queue in the interface module comprises:
    sending the communication signal to a plurality of the interfaces in the idle queue and the online queue according to an alternate sequence when a ratio of the number of the interfaces in the idle queue in the interface module to the number of the interfaces in the online queue in the interface module is greater than or equal to a first preset value.

5. The method according to claim 1, wherein determining sequence information of the communication signal sent to the idle queue or the online queue according to the relationship between the number of the interfaces positioned in the idle queue in the interface module and the number of the interfaces positioned in the online queue in the interface module comprises:

sending the communication signal to a plurality of the interfaces in the idle queue and the online queue according to a preset sequence corresponding to a ratio when the ratio of the number of the interfaces in the idle queue in the interface module to the number of the interfaces in the online queue in the interface module is less than or equal to a second preset value.

6. The method according to claim 1, wherein the method further comprises:

presetting priority information of a plurality of slave devices connected to each interface in the interface module.

7. The method according to claim 6, wherein the method further comprises:

modifying a preset priority information of the plurality of slave devices.

8. The method according to claim 6, wherein, when a plurality of the slave devices are in an effective response state in the interface, receiving the data information transmitted by the slave device in the interface comprises:

determining a slave device with a highest priority according to the priority information of the plurality of slave devices in the effective response state; and
receiving data information of the slave device with the highest priority.

9. The method according to claim 1, wherein a data communication content comprises:

a frame header; a physical ID; a command type; an application ID; a data value; and
a check bit.

10. The method according to claim 9, wherein a corresponding command is sent to the slave device of the interface according to the command type.

11. The method according to claim 1, wherein adding the physical ID information of the interface into the online queue comprises:

determining position information of the interface in the online queue according to priority information of the interface; and
adding the interface into a corresponding position of the online queue.

12. The method according to claim 1, wherein adding the physical ID information of the interface into the online queue comprises:

adding the interface into a tail part of the online queue.

13. A master device, comprising:

a processor configured for
initiating a communication signal to an interface in an interface module, wherein the communication signal comprises physical ID information of the interface; and
identifying whether the interface is online, adding the physical ID information of the interface into an online queue under a condition of receiving response information of a slave device connected to the interface, wherein a probability that one interface in the online queue is initiated with a subsequent communication signal is higher than that of one interface in an idle queue, wherein the processor is further configured for:
determining a pre-sending physical ID information of a corresponding interface in the interface module, comprising:
determining sequence information of the communication signal sent to the idle queue or the online queue according to a relationship between a number of the interfaces in the idle queue in the interface module and a number of the interfaces in the online queue in the interface module; and
determining the physical ID information of the interface corresponding to the communication signal sent this time according to the sequence information;
a transmitter, used for initiating the communication signal to the interface; and
a receiver, used for receiving data information transmitted by the slave device in the interface.

14. The master device according to claim 13, wherein the processor is further configured for:

adding physical ID information of all interfaces in the interface module into the idle queue.

15. The master device according to claim 13, wherein the processor is further configured for:

judging whether the interface is positioned in the online queue or not under a condition of not receiving the response information of the slave device connected to the interface; and if yes,
moving the physical ID information of the interface from the online queue to the idle queue.

16. The master device according to claim 13, wherein the processor is further configured for:

sending, through the transmitter, the communication signal to a plurality of the interfaces in the idle queue and the online queue according to an alternate sequence when a ratio of the number of the interfaces in the idle queue in the interface module to the number of the interfaces in the online queue in the interface module is greater than or equal to a first preset value.

17. The master device according to claim 13, wherein the processor is further configured for:

sending, through the transmitter, the communication signal to a plurality of the interfaces in the idle queue and the online queue according to a preset sequence corresponding to a ratio when the ratio of the number of the interfaces in the idle queue in the interface module to the number of the interfaces in the online queue in the interface module is less than or equal to a second preset value.

18. The master device according to claim 13, wherein the processor is further configured for:

presetting priority information of a plurality of the slave devices connected to each interface in the interface module.

19. The master device according to claim 18, wherein the processor is further configured for:

modifying the preset priority information of the slave devices.

20. The master device according to claim 18, wherein, when a plurality of the slave devices are in an effective response state in the interface, the processor is further configured for:

determining a slave device with a highest priority according to the priority information of the plurality of slave devices in the effective response state; and
the receiver is further configured for receiving data information of the slave device with the highest priority.

21. The master device according to claim 13, wherein a data communication content comprises:

a frame header; a physical ID; a command type; an application ID; a data value; and
a check bit.

22. The master device according to claim 21, wherein a corresponding command is sent to the slave device of the interface according to the command type.

23. The master device according to claim 13, wherein the processor is further configured for:
   determining position information of the interface in the online queue according to priority information of the interface; and
   adding the interface into a corresponding position of the online queue.

24. The master device according to claim 13, wherein the processor is further configured for:
   adding the interface into a tail part of the online queue.

25. A communication system, comprising the master device, the interface module and the slave device according to claim 13; wherein the interface module is connected with a plurality of interfaces, each interface of the plurality of interfaces is connected with one or more of the slave devices, and the master device performs data transmission with the slave devices through the interface module.

* * * * *